106-90.  AU 116  EX
3-26-74  XR  3,799,787

United States Patent Office 3,799,787
Patented Mar. 26, 1974

3,799,787
ADMIXTURES FOR FILLING NATURAL AND ARTIFICIAL SUBTERRANEAN VOIDS
William A. Davis, Kittanning, Pa., assignor to Michael L. Vongrey, Jr., Kittanning, Pa.
No Drawing. Original application Aug. 19, 1969, Ser. No. 851,457. Divided and this application Oct. 25, 1972, Ser. No. 300,870
Int. Cl. E02d 3/12; C09k 3/00
U.S. Cl. 106—287 SS
17 Claims

ABSTRACT OF THE DISCLOSURE

The back filling of natural and artificial subterranean voids for purposes of surface subsidence control and acid entrained water drainage control coming from such voids with a fluid formed admixture of a cementitious nature which solidifies upon setting in the void, the rate of solidification controlled by the amount of hydraulic cement or silicic acid added to the admixture. In the situation where the grout is employed also for control of acid entrained water drainage, ingredients are added to reduce the acid content to a by-product which is placed in colloidal suspension in a gelatinous material in the admixture due to fermentation of an activating agent with a fermenting agent of vegetable material and eliminate further formation of acid from subterranean potentially formable acid bearing strata to thereby re-establish the water table as well as providing safe palatable water.

Admixtures containing natural elements are provided which form a hydrating supporting mass. When the mass solidifies, it possesses a straight porous nature.

In the case of admixtures possessing a fermentation action, there is a leavening action causing the mass when placed in a subterranean void, to bloat and be expansive in nature to complete fill the area of the void.

CROSS REFERENCE TO RELATED APPLICATION

This is a divisional of patent application Ser. No. 851,-457 filed Aug. 19, 1969 in the name of William A. Davis.

BACKGROUND OF THE INVENTION

This invention relates to hydraulic and earth engineering and more particularly to earth control and compositions used in earth control programs. (61–35), (252–85+), (299–11), (106–85+).

Many substances and mixtures have been conceived in the past concerning the filling of natural or artificial voids found in the earth's crust or in the subterranean areas below the earth's surface, whether these voids consist of natural fissures or cavities, or abandoned mined-out areas, or the stabilization of soil masses beneath the surface of the earth upon which building structures have been built or intended to be built in the future. Included in these are the teachings of the following patents of interest:

| | | |
|---|---|---|
| Kirby | 900,683 | October 6, 1903. |
| Francois | 1,391,678 | September 27, 1921. |
| Goebl et al | 1,404,112 | January 17, 1922. |
| Zemlin | 1,820,722 | August 25, 1931. |
| Joosten | 1,827,238 | October 13, 1931. |
| Wertz | 2,254,252 | September 2, 1941 (61–36). |
| Wertz | 2,560,619 | July 17, 1951 (61–36). |
| Klein | 2,588,248 | March 4, 1952 (106–90). |
| Poulter | 2,627,169 | February 3, 1953 (61–35). |
| Armentrout | 3,028,913 | April 10, 1962 (166–29). |
| Row | 3,340,693 | September 12, 1967 (61–39). |

Reprints of papers presented before the Second Symposium on Coal Mine Drainage Research; Mellon Institute, May 14, 15, 1968, Pittsburgh, Pa.

These patents involve the use of various elements forming a composition or mixture of a cementitious nature some of which may contain conventional hydraulic cement together with various types of aggregates as a binding material to be supplied to the void area to bring about solidification upon setting to provide for surface support and prevent subsidence. In some cases, an element is added to the admixture to bring about an expansive nature to the entire mixture which, upon solidifying, expands to fill completely the void under consideration, particularly where fine subterranean fissures and crevices are involved. The main intent is to provide a rigid mass for back-filling of natural and artificial voids. In another case, the prevention of subterranean water flow into a mined-out cavity is contemplated but it has been known for many years past that it is next to impossible to stop or prevent the flow of subterranean waters with the result that the only practical approach is to permit such subterranean water to flow but at the same time divert their courses and check and control for acid entrainment thereof.

A representative example of the above patents is that to Poulter 2,627,169 wherein the method is provided for solidifying porous masses of earth or masonry and concrete by combining portland cement in suspension with a finely divided material containing sufficient acidic colloidal silica to retard gelation of the cement, and an oleaginous material, the cement and the material placed in suspension and render the resultant slurry highly plastic and flowable and capable of penetration. However, the problem of filling large voids, such as a mined-out area, is not contemplated or readily solved particularly where neutralizing of acid entrained mine drainage is involved and the re-establishment of the water table to provide for a palatable water supply.

It is the main intent herein to provide highly inexpensive cementitious type compositions or grouts for use in connection with surface subsidence control as well as provide in such grouts, where necessary, ingredients which bring about an expansive nature to the grout for foaming or bloating upon solidification the entire grout mass after the same has been poured into a natural or artificial void. In this manner the subterranean water flow may be diverted and naturally filtered preventing the formation of acid entrained water flow to insure re-establishment and stabilization of the subterranean water table.

SUMMARY OF THE INVENTION

This invention relates to the use of inexpensive fluid compositions or grouts having a cementitious nature which are supplied by means of pumping into underground natural or artificial (man-made) voids within the earth's crust to be allowed to thereafter harden, the rate of solidification dependent upon the particular situation and requirements. Such natural voids in the earth's crust include subterranean fissures, crevices, caverns, fractures, water-bearing strata, etc. or artificial voids produced by mining, such as abandoned coal mines and surface mined or stripped areas, commonly referred to as open pit mines, which have been abandoned and are to be or should be back-filled for returning the mined area back to a useable form for use by man.

It is the principal object of this invention to back-fill subterranean mined-out areas with a highly inexpensive fluid grout which hardens into a solid mass upon aging. Such a composition is used to fill natural or artificial voids within the earth's crust as subsidence control program where potential subsidence exists particularly where buildings are present or are to be built on the surface of the earth. Due to the many now abandoned mined-out areas existing in many parts of the country, such as, the Appalachian Lowlands, there is more than ever an urgent need for subsidence control. These mined-out areas having now existed for a number of years, in many cases well over 50 years, and now subsidence of the earth's crust or surface is being reported in many such areas. The old supports in these abandoned mines have now subsided due to age and the support of the subterranean area between the mined-out area and the surface soon begins to subside due to lack of proper support. This becomes a particular problem when there are present on the surface of the ground, homes or buildings which, of course, depend on good subterranean support. Upon proper analyzing of surface and subterranean conditions, the fluid compositions or grouts of this invention may be pumped into the mined-out areas to provide and insure proper surface support for building structures.

Another principal and very important object of this invention is control of acid entrained mine or subterranean water. The pollution of waters has become a major concern today since it contaminates our streams, destroys aquatic life, and poisons waterfowl and other wildlife creatures. The resultant effect is the spoiling of the landscape with the end effect of degrading the environment in which we live.

The main objective here is principally in connection with acid entrained mine drainage being constantly produced from active and abandoned mines. When these subterranean cavities are produced by man, certain elements are exposed unnaturally to the atmospheric environment and as a consequence there is produced highly contaminating acids, such as sulfuric acid which is carried away by subterranean water. These cavities also disturb the subterranean water table by providing a flow path different from that which previously existed naturally. As a result, the water table is dissipated or contaminated or both. By the same token, the acid entrained drainage from mined-out areas seeks the easiest courses which are the mine exits and contaminate nearby streams and rivers.

By supplying a medium of a suitable admixture, it is the principal purpose herein to return the King of Acids (sulfuric acid) to nature's vault, the man-made mined-out cavity by neutralizing the acid entrained drainage precipitating from the mine, forming a grout with this drainage, if of sufficient magnitude, and pumping the grout into the mined-out cavity to seal the cavity with the grout. The grout, being of natural elements, is permeable to permit subterranean waters to filter and penetrate slowly through the grout when solidified. As such, the grout functions to seal potential acid forming subterranean strata from an air environment but at the same time provides a natural "filtering" system to provide for re-establishment and stabilization of the water table and changes such underground water to fresh palatable water useful to mankind.

Many attempts have been made to eliminate the flow of acid entrained drainage from mined-out cavities. One such old method is by sealing off the mine entrances. However, it is impossible to stop the course of nature, and the fundamental flow of subterranean waters. As a result, subterranean waters will build up a pressure head and seek escape from underground by means of the path of least resistance. This may be around the edges of a sealed mine entrance or through fissures in the ground leading close to the surface which proved a convenient flow path after a sufficient pressure head has been built up.

Another method for sealing mines has been the employment of pumped concrete under pressure through small diameter boreholes. This method, as is demonstrated by the prior art, has been used successfully in the stabilization of building foundations. However, as can be expected the use of concrete mixtures is a highly expensive proposition and for this reason, has only been used for foundation stabilization rather than the backfilling of mined-out cavities.

It is well known that mine acid or sulfuric acid can be neutralized by use of hydrated lime. The use of lime for mine acid control has been used extensively. The chemistry of such neutralization is as follows:

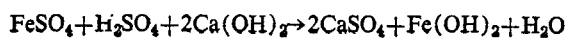
$FeSO_4 + H_2SO_4 + 2Ca(OH)_2 \rightarrow 2CaSO_4 + Fe(OH)_2 + H_2O$

This sulfuric acid can be reduced by a lime slurry to produce ferrous hydroxide and calcium sulfate together with water.

An acid mine drainage treatment plant utilizing such a neutralization process requires a subsequent oxidation process, usually accomplished by means of aeration, in order to reduce the ferrous hydroxide formed into ferric hydroxide. After this process, there follows sludge settling and handling and, at last, sludge disposal. By providing the proper ingredients in various forms of inexpensively produced grouts, such mined-out cavities can be efficiently filled with grout eliminating the necessity of providing the treatment plant mentioned above, which involves several processes and more expense as to maintenance.

It is the real intent, therefore, in this invention to as best as possible duplicate nature by attempting to restore the mined-out area into its original condition before disturbed by man using natural and abundantly found elements in the backfill materials.

One of the present methods being used now to control acid entrained water is the building of treatment facilities at stream sites having a high degree of acidity and using a separate lime neutralization process which increase alkalinity of the water to a point where it will sustain aquatic life. Examples of such treatment facilities can be found in the reprints of papers presented before the Second Symposium on Coal Mine Drainage Research, Mellon Institute, May 14, 15, 1968; Pittsburgh, Pa. Such a process is highly expensive particularly when viewed from the necessity of a multitude of such treatment plants and facilities to correct all of the now acid entrained streams and rivers, rendering such a treatment exorbitant in expense and unattractive for practical use. Not only is a capital expenditure involved but also the expense of continual maintenance and operation due to the fact that in a short time the lime application becomes ineffectual because widely dissipated in the acid entrained stream over a period of time after the lime has been added to the stream. Also continual additions of lime are required, based, of course, on the size of the acid control plant, and the degree of acid content in the steam being controlled.

Another method for controlling acid entrained mine water drainage is the air sealing off the mine or, by more recent theory, sealing off the mine and maintaining an inert atmosphere in the mine. The basic principle involved here is to exclude as much as possible, oxygen from a mine to prevent the oxidation of pyrite in the coal left in the mine and adjacent strata and thus prevent the formation of sulfuric acid. However, it has been found extremely difficult to seal off mines since mined-out areas "breathe" and as a result, it makes it impractical to completely seal off a mine air-tight or hold an inert atmosphere in the mine. Also, when sealing off the entrance of a mine, the pressure of the mine water in many cases is sufficient upon building up to seek its own path and exit from the mined-out area making it impractical to seal the mine with an inert atmosphere.

The only real practical way to prevent the foundation of such acid entrained mine water is to concern one's self with the mined-out area per se and seek to backfill the mined-out area by means of filling a mine cavity with fluid cementitious type grouts or diking area of the mine with such grouts to prevent the formation of acid entrained waters causing such waters to revert again to natural subterranean courses and as a result stabilize and recover the underground fresh water supply. To accomplish this, an inexpensive fluid grout may be utilized, as above mentioned, having acid neutralizing properties to neutralize the presently existing acid entrained mine water and capable of bloating or expanding to fill the mine cavity and prevent further forming of acid entrained mine water and its flow from the mined-out area.

Thus, it is a provision of the present invention to provide a fluid leavening agent entrained composition or grout for backfilling and hydrosealing of a mined-out area or excavation wherein the fluid composition becomes solidified within a minimum time of four to eight hours and producing a hydrate creating a filter pack and diverter for subterranean water and preventing the formation of acid entrained mine water which filtered and diverted water upon reaching surface streams, is useful for human and aquatic life.

Another provision of the present invention is the use of diking to form underground reservoirs for water retention such as in strip mine areas prior to backfilling to prevent the formation of acid entrained water. Since strip mining is generally done in adjacent contour strips, contour diking is performed to hold and maintain the water table that originally existed.

The particular constituents in the fluid composition or grout to be selected for subsidence and acid entrained water drainage control depends upon the subterranean environmental conditions at the site wherein such a program is to be carried out.

In subsidence control, the following procedure is generally followed in determining where potential as well as actual subsidence exists, particularly where a building structure on the surface has been enlarged due to potential subsidence, and the measures to be taken to correct for such subsidence including the proper grout to be employed.

First, information must be gathered as to the substrata formations of the earth below the existing building structure or a construction site. This information would include the substrata formations down to the cavity or void, such as an abandoned mine, creating the condition of potential subsidence.

Secondly, and now assuming an existing building structure is present, information must be obtained concerning the footers of the building structure. This information may be provided from old drawings in connection with the original construction of the building structure.

Thirdly, depending on the type of building structure, information must be obtained as to caissons, pilings, spread footers or floating foundations of the building structure so as to prevent destruction to the building when drilling test holes or bores used to possibly locate the subterranean void and thereafter pump the grout into the located subterranean void.

Fourth, compression tests should be made of the soil conditions and the substrata formations to determine the strength and capability for surface support.

An accepted engineering practice used to find the load bearing factor per square inch of ground is the employment of a timber approximately ½ foot by ½ foot in cross section which is placed in a vertical position on the ground area to be tested and maintained in this position by guides positioned at its base. An exact one ton weight is applied to and maintained at the top end of the timber to determine the degree of penetration of the bottom end of the timber into the ground over a period of time, such as, for example, one hour; one day; thirty days; and then sixty days.

Fifth, determination should be made for possible lateral and subjacent movement of substrata formations to determine the subterranean direction and probable magnitude of a potential subsidence. This is particularly true in these situations where the building structure is on the side of a hill. Potential side hill movement must be determined.

Sixth, from the foregoing information, it will be possible to make a determination of the balancing factor of subsidence control, that is, in connection with an existing building it will be possible to make a determination of the moments of inertia effecting the building, such as the bending moments of the structure.

Seventh, from this balancing factor, a determination can then be made as to the proper ingredients to be used in the fluid cementitious grout to prevent future subsidence.

In the situation where a building structure is to be built on the site, consideration must be had as to the final weight of the structure in determining the balancing factor.

Eighth, if an artificial void is involved, such as an abandoned mine, maps showing the details of the mine should be studied as to where surface subsidence may possibly occur and at what specific areas, if not the entire mined-out area, in the mine should be filled with grout to prevent potential subsidence. If a map or drawing of the mine is not available, test holes must be drilled to determine the layout of the mine. In determining the layout of the mine, unknown to anyone, a study of the terrain or topography is made and when considered with knowledge as to how subterranean geological veins of materials of the earth are formed in direction and magnitude for the particular region involved, such as a coal vein, then a very good determination can be made as the possible location and layout of the mine.

Generally with respect to older mined-out areas, once there is knowledge concerning the original subterranean coal vein, then the mine layout can be determined with relative accuracy because these older mines generally follow a pattern wherein the main shaft would go in for several hundred feet to a "T" intersection, one channel of the "T" providing the air and fluid drainage channel and the other channel of the "T" being the main lead-in to mine proper. The probable layout can be checked by drilling a series of test holes into the subterranean level of the mined-out area. These same test holes can be used to pump into the mined-out area, the prepared grout.

Usually, when a mine is involved in a subsidence control program, there also exists the problem of acid entrained mine water drainage appearing in streams and coming from the mine entrances and natural openings formed by the drainage coming from the mined-out area. Also, such drainage may have contaminated the existing water table in the vicinity of the mined-out area. As mentioned above, the grout of this invention may be provided with a highly inexpensive expansion agent to not only provide for subsidence control but also provide for mine acid drainage control by purging the mined-out area with foam forming and expansive grout to seal off further direct drainage from the mine and prevent the formation of further mine acid as well as creating a forced pervious filtering system to clear and purify the subterranean water to stabilize again the subterranean water table.

A method of a series of diking can be used in large mined-out areas as strip mine areas to bring about control in acid entrained mine water drainage. In the case of strip mine areas, not only can reclamation be had of the stripped area but also by proper contour diking in the strip mine pit areas can re-stabilize and maintain the water table that once previously existed in natural state.

Reference is now made to the ingredients used to make the admixtures of this invention.

It is well known that one of the most abundant elements found on the earth is silicon which is found in a natural state in various crystalline forms and modifications. Silicon dioxide, $SiO_2$, which is referred to as silica occurs frequently in nature in a wide variety of forms such as quartz, sand, flint, etc. and constitutes about ⅛ of the earth's crust.

Silica in suspension is known to have a high adhering or cohesive action upon which hydration also may be referred to as a cementitious action. A colloidal suspension of silica is also referred to as silica gel and is produced by the reduction of silica by, for example, a strong acid to produce the composition expressed as $(SiO_2)_x(H_2O)_y$ having great cohesive action. Many believe that silica in suspension occurring in nature on a continuous basis is a primary factor for maintenance of the upper layers of the earth cohesively together. If this did not occur naturally, the earth would not be as stable as it is now, which is necesary for man's environment.

Silica in suspension usually occurs very slowly in nature. Natural silica in suspension is formed by acids from disintegrating vegetation, such as tannic acid from leaves and tree bark which permeate and seep through the ground to lower subterranean layers and strata which upon natural contact with silica, produces hydrates of silica, giving the silica the capability of being able to directly combine with water and in forming a hydrate will solidify in a cementitious manner into a porous structural type mass. It is nature's own natural chemical precipitating action. When this occurs in nature, a cementitious admixture is formed having the above mentioned cohesive power on all adjacent solid matter in adjacent strata on layers. In this natural phenomenon, silica in suspension also has a natural expansive action.

What is done here is to take this natural phenomenon of silica in suspension and duplicate it on a mass scale and increase or accelerate the natural action artificially so that solidification may occur in a manner of hours.

The basic backfill admixture for subsidence control comprises dry and ground culm usually abundantly present in mined-out areas together with what I term dry garden cement and water. Garden cement is the familiar top soil found on the very top of the earth's surface. The need for top soil is its mud characteristics as well as its yeast content, as will be seen later. The yeast content of garden cement helps to bring about a cohesiveness to the admixture which is maintained after the admixture has been placed in the area of the void and allowed to solidify. The culm being the principal element in the admixture, is termed the bulk filler or carrier.

A sufficient amount of water is added to permit the grout to be pumped under high pressure into the void or mined-out area without clogging the pumping facility, the connecting pipe line and the bore or opening prepared to the mine or void to be treated.

Portland cement may be added to this admixture in sufficient quantities to control the period of time of solidification after the grout has been properly placed in the void area. An example of use of portland cement is in a final sealing mix used at the entrance of a mine where subsidence and surface erosion control level is at a maximum because of the weight of surface structures existing or to be built on the surface as well as natural environment eroding and penetrating elements.

Since portland cement has the capability of hardening very quickly, rather than varying the quantity of such cement in the admixture, it may be more convenient to use Carney cement. Carney cement possesses a slower rate of solidification and, thus, is useful where one desires that the grout naturally spread and dispersed in a greater area in the void or mine area at the point of dispensing the grout into the void area.

Also Medusa cement may be used together with portland cement, the two cements providing for better surface support in subsidence control situation. Medusa cement is used with portland cement to prolong the period of solidification since Medusa cement will not set for 24 hours. Hydrate lime may also be added to insure initial acid drainage control.

Also sand or gravel may be introduced into the admixture for purposes of added strength to the final sealing grout.

Bentonite clay or local ground clay may be used in substitute of garden cement depending upon the availabily of such materials.

In mixing these materials to form the grout, a borrow pit may be prepared which consists of a large pit, the materials from which may be used in the admixture such as the garden cement or clay and culm, if these materials are present at the site of the borrow pit. The borrow pit may be prepared on available land near to the area of the void or point of introduction of the prepared grout into the void area.

In cases where void areas are close to the surface of the ground where there is a building structure, for example within 75 feet of the surface of the ground, surface and footer support may be enhanced by using portland cement and Carney cement together with a bulk filler or carrier in the form of silica loam and garden cement. Where, however, the void is below 75 feet or involves mined-out cavities, less portland cement may be used with the elimination of the Carney cement, and culm or buckwheat shale may be substituted as the bulk carrier to provide for surface and footer support. These admixtures provide for greater bearing area for the building structure as compared to the general backfill admixture first mentioned above and containing culm and garden cement.

The admixture for void areas above 75 feet is quicker setting than the admixture for void areas below 75 feet and both take care of underground water by dispersing it and causing it to take more stringent and multiple paths of flow. Subterranean water present under existing buildings may be, thus, controlled by breaking up its concentration to provide for a better and increased surface bearing area for a building structure. The greater the concentration of such subterranean water, the larger the void area to be filled. The admixture being composed of natural materials acts as a dispersion bed for dispersing and breaking up such subterranean waters. Upon solidification, it will also act as a natural filter bed while providing for surface support.

The materials employed in these admixtures must be ground or of a size small enough to be pumped through the pump line and the bore holes prepared to void areas. The clay materials in the silica loam and admixtures above discussed acts as a lubricant for the pumping operation to permit free flow of the admixture to void area without clogging. The type of pumps that may be used are the conventional cement pumps such as those manufactured by the Koehring Company in Milwaukee, Wis.

In connection with the already mentioned admixtures, a lime slurry may also be added to aid in controlling the time of solidification since hydrate lime will, in a manner, control the water content of the admixture.

Attention is now directed to admixtures not only useful for bulk backfilling of void areas but also for control of mine acid drainage wherein there is added a neutralizing agent and also, if need be, a leavening composition to cause the grout to become bloated with many entrained gas bubbles and thereby creating a natural filter bed for the flowing subterranean waters as well as filling up completely fissures and cracks or caved-in areas of void areas to be sealed.

As a bulk carrier, again dry ground culm or dry ground clay may be used. As a general backfilling admixture with a neutralizing agent, hydrated lime and sand entrained silica loam may be provided with the bulk carrier.

Where a large void area is involved and it is desirable to fill completely the entire void area and provide and maintain acid drainage control, with the minimum of expense in regard to the materials to be utilized, soapstone may be used with the bulk carrier and lime slurry. Soapstone is excellent in an acid control program because it can be abundantly found. Doloris clay can be used instead of soapstone.

An admixture for back filling and mine acid control can be provided where quick setting of the grout is desirable as well as the formation of a massive filtering and dispersion bed upon solidification. This admixture comprises a large quantity of soapstone, although a selected amount of the bulk carrier, such as clay or culm, may also be provided, together with hydrated lime, silica loam and portland cement. Sufficient water is added to make the prepared grout flowable by means of pumping.

At best, the preferred mine acid control neutralizing admixture comprises a bulk carrier such as crushed or ground culm obtained from a borrow pit or mine spoil pile to which is added soapstone, garden cement, a vegetable flour, silica loam and hydrated lime. In this admixture the silica loam is prepared for suspension by the flotation action of the yeast abundantly present in the garden cement fermenting with the vegetable flour. Examples of vegetable flour are corncob flour, wild wheat flour or rice flour.

The water for these admixtures may be any water locally available. The most available and preferable water in the case of a mined-out area is the mine acid drainage which is collected in the borrow pit and neutralized by the action of the admixture. The soapstone containing a large amount of iron oxide reacts with the sulfuric acid in the water to form a reddish material comprising sulfates and sulfides of iron which is held in the colloidal formation of silica and in the formed gas bubbles developed throughout the entire admixture due to the fermentation of the yeast and vegetable flour vehicle. As a result, the admixture has the property of bloating or expanding, due to the leavening action, to fill the entire void area including caved-in areas at the top of the void cavity and also functions to produce a pervious bed of material upon solidification to filter the subterranean waters, dispersing their flow into a multitude and of divergent paths and, further, sealing off acid forming strata layers in the void cavity from oxidizing elements of the atmosphere to prevent further formation of mine acid drainage. This natural filtering and dispersion also provides stabilization and maintenance of the water table which is readily destroyed in underground and strip mining. Solidification of the admixture will seal therewithin the potentially acid forming materials, such as found in culm and pyrite, to maintain such materials dormant as was the case before they were originally disturbed by man and exposed to the atmosphere and other elements such as magnesium, alumina, water, etc. which brought about in a natural way the formation of contaminating elements, such as, sulfuric acid, detrimental and destructive of living matter and animal life.

As previously indicated, the principle of diking may be utilized where the mined-out area is not to be entirely filled because of a matter of expense and also subsidence control is necessary only at specific surface areas or locations. Contour diking may be employed during strip mining operations as each strip is made and completed ready to be backfilled. In such cases, the admixture may provide mine acid control. A convenient admixture for this purpose is dry ground culm as a bulk carrier together with garden cement, hydrated lime, vegetable flour, such as corncob flour, and water.

Reference will now be made specifically to compositions by percent weight comprising the foregoing admixtures to illustrate practical embodiments of the grout that can be utilized for subsidence control, mine acid control, surface and footer support, diking and a final sealing mix for entrances to voids or mines constantly exposed to natural environmental elements.

These admixtures serve only as examples, for purposes of clarity, of grouts that may be employed in carrying out the objects of this invention and are not and cannot be construed to limit the invention to any particular form because each specific natural or artificial void situation requires analysis initial to determine the proper admixture. Also, it must be known whether subsidence or mine acid control both is desired.

Example I

| | Percent |
|---|---|
| Garden cement or bentonite clay | 25 |
| Dry ground culm | 75 |

The amount of garden cement may be varied from 14% to 35% of the admixture whereas the culm may vary in total percent weight from 60% to 85%. Water is added in an amount sufficient to make a slurry and the degree of consistency depends upon the pumping pressure to be used and the space requirements of the void area to be filled. Approximately ½% to 5% of vegetable flour may be added for purposes of imparting to the admixture an enhanced expansive nature caused from the leavening action of yeast in the garden cement and the flour.

Example II

The following admixture is best suited for surface subsidence control where stratified layers underground are present, the Medusa cement extending the time for solidification in order to permit high pressure pumping action for a period of time to insure that all areas of the void, including small or minute fissures and cracks are filled.

| | By percent weight | |
|---|---|---|
| Composition | Recommended admixture | Percent range of variation |
| Medusa cement | } 10 | 5-20 |
| Portland cement | | |
| Hydrated lime | 2 | ½-5 |
| Garden cement | 67 | 50-75 |
| Silica loam | 21 | 15-30 |
| Total | 100 | |

Example III

The following admixture is best suited for surface and footer support within 75 feet of the surface of the ground.

| | By percent weight | |
|---|---|---|
| Composition | Recommended admixture | Percent range of variation |
| Portland cement | 20 | 12-30 |
| Silica loam | 33 | 20-45 |
| Carney cement | 12 | 5-20 |
| Garden cement | 35 | 20-50 |
| Total | 100 | |

As can be seen, the silica loam and garden cement would be the bulk fillers. Since the void to be filled is close to the surface of the ground, strong cementitious admixture is provided with the bulk carrier being preferably of materials common within 75 feet of the surface of the ground. Fissures or voids present within this ground area are normally not of large size as compared to those of a mined-out cavity or a deep subterranean cavern.

Example IV

The following admixture is best suited for surface and footer support below approximately 75 feet from the surface of the ground in filling of the void areas down to and including old mine workings.

| | By percent weight | |
|---|---|---|
| Composition | Recommended admixture | Percent range of variation |
| Portland cement | 12 | 5-20 |
| Hydrated lime | 6 | 3-10 |
| Silica loam | 33 | 20-45 |
| Garden cement | 20 | 12-30 |
| Buckwheat shale | 29 | 20-40 |
| Total | 100 | |

The lime included is only a small percentage and is added to bring about any required neutralizing of mine acid drainage that may be present at the time of placement of the grout. Note that the bulk filler here consists of the shale common to such workings and the silica loam to provide the silica suspension. The portland cement gives added strength depending on the surface bearing factor desired, as well as controlling the rate of solidification.

As to those admixtures where mine acid control is desirable, the following examples with percent range of variation are given.

EXAMPLE V

| Composition | By percent weight | |
|---|---|---|
| | Recommended admixture | Percent range of variation |
| Local ground clay or dry ground culm | 70 | 60-80 |
| Hydrated lime | 6 | 3-10 |
| Sand entrained silica loam | 24 | 15-35 |
| Total | 100 | |

EXAMPLE VI

| Composition | By percent weight | |
|---|---|---|
| | Recommended admixture | Percent range of variation |
| Local ground clay or dry ground culm | 67 | 50-75 |
| Soapstone | 27 | 15-40 |
| Hydrated lime | 6 | 3-10 |
| Total | 100 | |

These foregoing examples represent the least expensive admixtures for combination subsidence and mine acid control. The following example has added thereto portland cement to control the rate of solidification as well as produce a fast drying grout.

EXAMPLE VII

| Composition | By percent weight | |
|---|---|---|
| | Recommended admixture | Percent range of variation |
| Soapstone | 47 | 30-60 |
| Hydrated lime | 10 | 5-20 |
| Silica loam | 33 | 20-45 |
| Portland cement | 10 | 5-20 |
| Total | 100 | |

For purposes of underground diking and contour diking in a strip mine operation and yet provide for drainage control and neutralization of the water table, the best suited admixture is as follows:

EXAMPLE VIII

| Composition | By percent weight | |
|---|---|---|
| | Recommended admixture | Percent range of variation |
| Dry ground culm | 70 | 60-80 |
| Garden cement | 25 | 15-40 |
| Hydrated lime | 3 | 1-6 |
| Vegetable flour (corncob flour) | 2 | ½-5 |
| Total | 100 | |

In connection with the preferred admixture for mine acid control as well as providing subsidence control, the following is offered by way of example in weight. A batch is prepared in the borrow pit and is approximately 3000 pounds per cubic yard. It should be noted that there is approximately 325 pounds of yeast in an acre of good garden cement. What is meant here by good garden cement is good enriched black top soil. However, it is not always necessary to use such top soil. Top soils of lesser enrichment may be used. The amount of soil in the admixture need merely be increased to obtain the necessary amount of yeast to bring about the desired leavening action. The type of garden cement to be used, of course, will depend greatly on its location and proximity to the area of void to be filled.

Example IX

Composition: Amount in pounds
 Crushed or ground culm (bulk carrier) _____ 1800
 Garden cement (activating agent) _____ 300
 Hydrated lime (direct neutralizer) _____ 150
 Soapstone (neutralizing reactionary reagent) __ 500
 Vegetable flour (fermenting agent vehicle) ___ 50
 Silica loam _____ 300
                                 3100

In those cases where the void opens to the surface or is exposed to atmospheric conditions, a special final sealing admixture may be provided which is weather and erosion resistant to surface water and other natural environmental elements, as follows.

EXAMPLE X

| Composition | By percent weight | |
|---|---|---|
| | Recommended admixture | Percent range of variation |
| Dry ground culm | 35 | 20-45 |
| Dry garden cement | 22 | 15-30 |
| Portland cement | 8 | 4-25 |
| Sand and gravel | 35 | 20-45 |
| Total | 100 | |

Concrete base here is an a greater quantity as compared to previous admixtures in order to provide a greater firmness and hardness upon solidification and, as a practical manner, provide for improved erosion resistant to surface waters. Also ½% to 5% volume (preferably 1%) of silicic acid may be added to admixture instead of portland cement to bring about the necessary degree of hardness. This compound is known to be readily prepared by heating silica in colloidal suspension.

As previously mentioned, the iron oxide in the admixture reacts with the sulfuric acid to form a rust colored sulphate which is sealed within the admixture upon the flotation action of the yeast of the garden cement combining with the vegetable flour and, is situated in the suspension of the colloidal silica. The yeast and flour fermentation produces a gaseous by-product, the bubbles of which are dispersed throughout the admixture upon solidification and remain as such and, thus, give the grout upon such solidification an expanding or bloating nature in order that complete filling of the void area can be accomplished. At the same time, the solidified grout is pervious to subterranean waters performing the function of a filtering and dispersion bed. The silica in suspension being withheld in a bonded mass duplicates the action of nature in providing clear and uncontaminated subterranean water supply as well as restoring and stabilizing the previous water table which was destroyed by man in disturbing the subterranean layers as by mining.

In the case of subsidence and mine acid drainage control, the normal procedure for filling such mine cavities is to drill several bore holes into the mine cavity through which is dispensed the grout. A locking plug may be provided in the bore holes in order to act as a check valve and prevent the grout, due to back pressure, to be forced back out of the bore holes.

In most mine situations, particularly the older mine workings, it is generally true that a lot of cave-ins have occurred falling in from the top of the mine cavity tunnel and continually occurring creating cavities extended upward from the original mine void toward the surface level. The first operation is usually underground diking with use of the admixture (Example VIII) above given to seal the entrances to the mined-out area. Then with the provision of several bore holes into the entire mine cavity, admixture may be supplied to completely fill the mined-out area using for example, the admixture of Example IX. After this has been accomplished, the final sealing admixture of Example X can be employed to seal the entrances of the mine, which admixture is erosion resistant to surface drainage and atmospheric environmental elements.

In the case of contour strip surface mining, the general strip pit mining usually occurs on a varying elevation from a low line level starting at the crop line wherein the first cut is made, up to a higher level wherein the last cut in the strip mining operation is made. As each cut is made, a dike using the admixtures of this invention, such as admixture VIII, is formed against the lower high wall usually about 10 to 16 feet in height in order to prevent the seepage and drainage of acid mine water which developes upon exposure of the pyrite and other such elements to the atmosphere as well as holding back subterranean waters, in the manner of a previous levey, and thereby maintaining the water table that previously existed before commencement of the strip mining operation. After the dike is built, the previous strip pit area may be filled by the materials obtained by the next adjacent contour strip mining cut. This process of diking and refilling of the adjacent strip mining cut is continued until completion of the mining operation.

Upon final contouring of the area of the strip mining operation, which is now generally required by law, surface diversion trenches may be provided on the surface of every other previously strip mining cut in order to divert surface water quickly away from the mined area and prevent the seepage and penetration of disintegrated vegetable matter such as leaves, bark and other vegetation to permeate the strip mine area. As a matter of assurance, the diversion of surface water eliminates the further possible contamination of subterranean water, which after contaminated, may sink into the relocated strip mine fill.

I claim:

1. An admixture for filling natural and artificial subterranean voids solidifying into a hardened mass consisting of a bulk carrier and filler comprising crushed dry culm 60%-wt.–85%-wt. and a lubricant agent 14%-wt.–35%-wt. comprising yeast entrained top soil together with water to form a slurry.

2. The admixture of claim 1 characterized by bentonite clay as a lubricant agent in lieu of yeast entrained top soil.

3. The admixture of claim 1 characterized by the addition of portland cement to control the rate of solidification of the admixture when being placed into the subterranean void.

4. The admixture of claim 1 characterized by the addition of Carney cement to control the rate of solidification of the admixture when being placed into the subterranean void.

5. An admixture for filling natural and artificially formed subterranean voids substantially close to the surface of the earth solidifying into a hardened mass to provide for greater surface support and footer support for existing building structures consisting of a bulk filler comprising silica in colloidal suspension produced from hydrous formation of silica loam 20%-wt.–45%-wt. and yeast entrained natural soil 20%-wt.–50%-wt.

6. The admixture of claim 5 characterized by the addition of portland cement 12%-wt.–30%-wt. to control the rate of hydration and give added strength to the admixture on solidification.

7. The admixture of claim 6 characterized by the addition of Medusa cement 5%-wt.–20%-wt. to control the rate of hydration of the admixture when being placed into the subterranean void.

8. The admixture of claim 6 characterized by the addition of Carney cement 5%-wt.–20%-wt. to control the rate of hydration and give added strength to the admixture on solidification.

9. An admixture for filling natural and artificially formed subterranean voids more than approximately seventy-five feet below the surface of the earth solidifying into a hardened mass to provide for greater surface support and footer support for existing building structures consisting of a bulk filler 20%-wt.–40%-wt. selected from the group consisting of dry ground culm, buckwheat shale, and bentonite clay, and silica in colloidal suspension produced from hydrous formation of silica loam 20%-wt.–45%-wt. and yeast entrained natural soil 12%-wt.–30%-wt.

10. The admixture of claim 9 characterized by the addition of a neutralizing agent 3%-wt.–10%-wt. in the form of a hydrated lime slurry to effectively neutralize the presence of any acid entrained subterranean drainage.

11. The admixture of claim 10 characterized by the addition of a neutralizing agent in the form of a hydrated lime slurry to effectively neutralize the presence of any acid entrained subterranean drainage.

12. An admixture for filling natural and artificially formed subterranean voids solidifying into a hardened mass and neutralizing of and preventing further formation of subterranean acid drainage comprising a bulk filler 30%-wt.–80%-wt. selected from the group of dry crushed culm, bentonite clay and soapstone, a hydrated lime slurry 3%-wt.–10%-wt. and silica loam 15%-wt.–35%-wt.

13. The admixture of claim 12 characterized by the addition of portland cement 5%-wt.–20%-wt. to control the rate of hydration of the admixture when being placed into the subterranean void.

14. In a cementitious type admixture for filling natural and artificially formed subterranean voids hydrating into a hardened mass and neutralizing of and preventing further formation of subterranean acid drainage, the combination of the following hydratable ingredients: a bulk carrier and filler comprising crushed dry culm, an activating agent comprising conventional yeast entrained natural soil, a fermenting agent comprising vegetable flour, a gelatinous agent comprising silica loam, an acid neutralizing reactionary reagent comprising a metallic oxide.

15. In the composition of claim 14, the inclusion of portland cement to control the rate of hydration.

16. In the composition of claim 14, iron oxide in the form of soapstone comprising the acid reactionary reagent.

17. In the composition of claim 14, the inclusion of one or more of corncob flour, wild wheat flour or rice flour comprising the fermenting agent.

References Cited

UNITED STATES PATENTS

| | | | |
|---|---|---|---|
| 2,158,025 | 5/1929 | Hulst | 106—287 SS |
| 2,310,652 | 2/1943 | Peter | 71—24 |

OTHER REFERENCES

Chem. Abst. 62:15, 956p (1965).

THEODORE MORRIS, Primary Examiner

U.S. Cl. X.R.

106—90; 61—36